United States Patent [19]

Benjey

[11] Patent Number: 5,417,240
[45] Date of Patent: May 23, 1995

[54] CAP SENSITIVE HEAD VALVE FOR VEHICLE FUEL SYSTEM

[75] Inventor: Robert P. Benjey, Dexter, Mich.

[73] Assignee: G.T. Products, Inc., Ann Arbor, Mich.

[21] Appl. No.: 148,442

[22] Filed: Nov. 8, 1993

[51] Int. Cl.⁶ .......................................... F16K 24/00
[52] U.S. Cl. .................. 137/587; 123/519; 220/86.2; 220/746
[58] Field of Search ............... 137/587, 588; 141/59; 220/86.2, 746, 749; 123/519

[56] References Cited

U.S. PATENT DOCUMENTS

| | | | |
|---|---|---|---|
| 3,738,384 | 6/1973 | Hall | 137/493 |
| 4,392,507 | 7/1983 | Harris | 137/38 |
| 4,742,844 | 5/1988 | Selaga | 137/493 |
| 4,779,755 | 10/1988 | Harris | 220/203 |
| 4,790,349 | 12/1988 | Harris | 137/587 |
| 5,004,002 | 4/1991 | Kabayashi | 137/39 |
| 5,028,244 | 7/1991 | Szlaga | 55/170 |
| 5,029,722 | 7/1991 | Bollinger et al. | 220/86.2 X |
| 5,054,508 | 10/1991 | Benjey | 137/587 X |
| 5,099,880 | 3/1992 | Szlaga et al. | 137/587 |
| 5,116,257 | 5/1992 | Szlaga | 137/43 |
| 5,156,178 | 10/1992 | Harris | 137/587 X |
| 5,215,110 | 6/1993 | Benjey | 137/587 X |
| 5,318,069 | 6/1994 | Harris | 137/588 |

Primary Examiner—John Rivell
Attorney, Agent, or Firm—Young, MacFarlane & Wood

[57] ABSTRACT

A head valve for maintaining a desired pressure head in a vehicle fuel tank which responds automatically to pressure changes in the filler pipe corresponding to a change from normal vehicle operation to a refueling operation to adjust the pressure head maintained by the head valve. In a vehicle fuel system including a filler pipe selectively opened and closed by a cap, the valve of the present invention responds to pressure changes near the filler pipe inlet upon removal of the cap to increase the pressure head it maintains in fuel tank 10 and prevent the fuel tank from being overfilled. When the refueling operation is completed and the cap is replaced, the change in pressure near the filler pipe inlet operates the valve to decrease its head valve closing force and reduce the pressure head maintained in the tank for normal vehicle operation. In one embodiment the valve includes a spring-biased diaphragm control element operated by the pressure changes in the filler pipe to move against and away from a spring-biased head valve element, resulting in a corresponding decrease and increase in the closing bias of the head valve element and the resulting pressure head maintained in fuel tank 10.

16 Claims, 3 Drawing Sheets

CAP SENSITIVE HEAD VALVE FOR VEHICLE FUEL SYSTEM

FIELD OF THE INVENTION

The present invention is related to vehicle fuel system head valves for selectively venting fuel vapor from a fuel tank when a specified tank vapor pressure is exceeded, and more particularly to a head valve whose opening force is adjustable in response to pressure conditions in the vehicle filler pipe.

BACKGROUND OF THE INVENTION

It is well known to use a head valve in a vehicle fuel system to control fill quality of the fuel tank by maintaining a head pressure which prevents overfilling, and still provide vapor venting when the vehicle is running. Such head valves are often spring-biased to a closed position, and are "blown" open when the pressure head is exceeded to vent excess vapor pressure to the canister.

It is generally desirable to minimize vapor flow from the fuel tank during refueling to maintain a high head pressure in the fuel tank during refueling. This head pressure ensures that the automatic shutoff mechanism in the filler nozzle operates properly without overfilling the fuel tank. However, during normal vehicle operation and prior to refueling it is desirable to reduce the tank head pressure to minimize "puff loss" of fuel vapor to the atmosphere when the fuel tank filler pipe is opened for refueling. For example, during refueling it may be desirable to maintain the tank pressure head as high as 12 inches of water pressure, and during normal vehicle operation as low as possible, for example 1-2 inches of water pressure.

The filler pipe inlet in vehicle fuel systems is typically closed by a removable cap. When closed, the upper end of the filler pipe inlet quickly reaches pressure equilibrium with the fuel tank; when opened the upper end of the filler pipe is at atmospheric pressure substantially less than fuel tank pressure. Accordingly, start and finish of refueling operations is typically signaled by pressure changes in the upper end of the filler pipe as it is opened and closed for refueling.

Pressure condition changes at the filler pipe inlet have been used to open and close pressure-operated valve structure, for example a diaphragm-operated control valve which opens and closes various vent pathways between the fuel tank and a vapor canister in response to pressure changes communicated to the diaphragm by a signal pressure line from the filler pipe inlet. Examples of cap-responsive pressure operated valves are shown in U.S. Pat. Nos. 5,054,508; 5,215,110; and 4,714,172.

SUMMARY OF THE INVENTION

The present invention resides in a novel head valve whose pressure head relief bias is adjustable in response to changing pressure conditions in the filler pipe which indicate the start and finish of a refueling operation. During refueling the bias of the head valve maintains a high pressure head in the tank to ensure proper operation of the filler nozzle shutoff mechanism and to prevent overfilling the fuel tank. When refueling is finished, the closing force or relief bias of the head valve is significantly reduced to maintain a second, lower pressure head in the fuel tank during normal vehicle operation. This is achieved with pressure-responsive control means in the valve body which respond to pressure changes in the filler pipe to reduce the relief bias of the head valve for normal vehicle operation.

The head valve can accordingly be given a refueling relief bias, for example by a spring, which maintains a high pressure head in the fuel tank. When pressure changes in the filler pipe inlet indicate a refueling operation, the refueling bias of the head valve is in effect. However, when pressure changes at the filler pipe inlet indicate the end of the refueling operation, for example when the filler pipe inlet is closed by a cap, the control means are enabled to reduce the relief bias of the head valve and therefore the tank pressure head for normal vehicle operation.

In one embodiment of the invention a head valve is mounted in a hollow valve body in series between a fuel tank vapor inlet and an outlet to the vapor canister, spring-biased to a closed position with a closing force or bias which maintains a first, high pressure head desirable for refueling. A diaphragm control element is located in the valve body adjacent the head valve and in series between the fuel tank vapor inlet and a signal pressure line from the upper end of the filler pipe. The diaphragm control element is movable between a first position in a direction opposed to the closing bias of the head valve, and a second position in a direction away from the closing bias of the head valve. An actuating element on the diaphragm control element is at least selectively connected to the head valve to reduce the closing bias of the head valve in the second position, thereby reducing the tank pressure head maintained by the head valve.

In a particular embodiment the actuating element is a finger which pushes against the closing bias of the head valve in response to filler pipe pressure conditions when the cap is on, and which is pulled out of engagement with the head valve in response to filler pipe pressure conditions when the cap is off. The diaphragm control element is pressure balanced when the cap is on, allowing a spring bias to operate the actuating element and reduce the closing force of the head valve.

With the present invention the relief bias or closing force of the head valve is automatically adjusted to maintain a lower pressure head during vehicle operation, and a higher pressure head during refueling operations, all in response to pressure changes in the filler pipe. In a cap-operated filler pipe the head valve is effectively responsive to the position of the filler pipe cap to automatically adjust the pressure head maintained by the head valve.

These and other features of the present invention will become apparent upon a further reading of the specification.

DETAILED DESCRIPTION OF THE DRAWINGS

Figure 1:
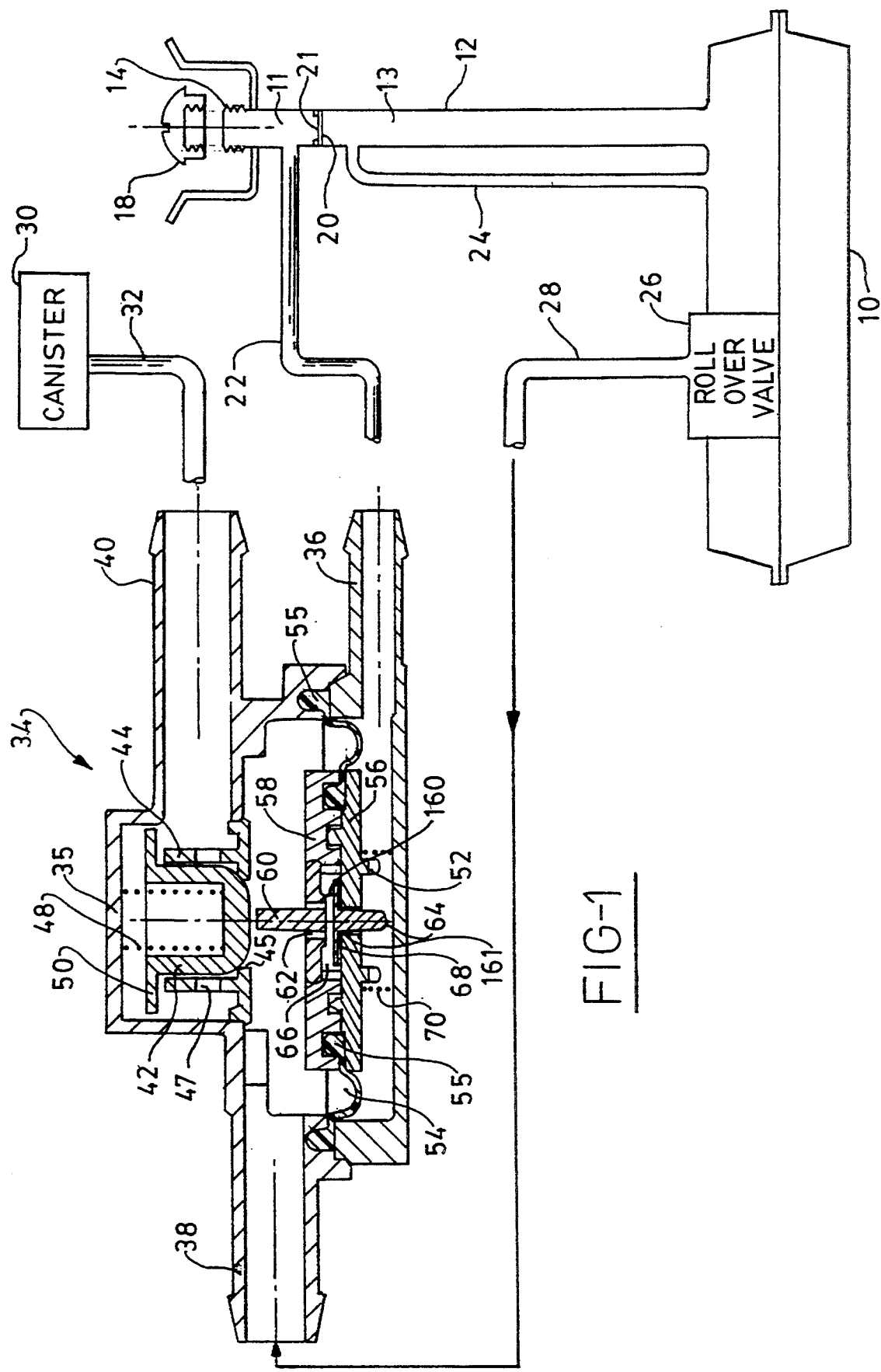
FIG. 1 is a schematic illustration of a vehicle fuel system incorporating a pressure-responsive head valve according to the present invention during a refueling operation.

Referring to FIG. 1, the present invention is shown in a vehicle fuel system having a fuel tank 10 and filler pipe 12 with an inlet 14 selectively closed by a threaded cap 18. A partition 20 located in the filler pipe near inlet 14 divides the filler pipe into an upper end 11 and a lower end 13. Partition 20 includes an opening sized to permit insertion of a filler nozzle (not shown) for introducing fuel into tank 10. In the illustrated embodiment partition 20 is closed by a trap door 21 of the non-sealing type; i.e., with cap 18 on inlet 14 and trap door 21 in the closed position, fuel vapor from tank 10 flows past door 21 to bring upper end 11 of the filler pipe into pressure equilibrium with lower end 13 and tank 10.

When cap 18 is removed and the filler nozzle is inserted through partition 21 in a refueling operation, upper end 11 of the filler pipe is at atmospheric pressure, while the vehicle fuel tank is a higher vapor pressure. When refueling is completed and cap 18 is replaced on inlet 14, the pressure in upper end 11 of filler pipe 14 returns to tank vapor pressure.

In order to positively operate the filler nozzle shutoff mechanism and prevent the fuel tank from being overfilled, it is desirable to maintain a relatively high pressure head in the fuel tank. This forces liquid fuel back up a vent tube 24 and filler pipe 12 as the tank fills, activating the nozzle shutoff while maintaining a vapor space in the tank to prevent further filling. In the illustrated embodiment the desired fuel tank pressure head during refueling is approximately 12 inches of water pressure.

Fuel tank 10 is provided with a rollover vent valve 26 of a known type, which continuously vents fuel vapor from tank 10 when the tank is in a normal operating position. Rollover valves typically close to prevent leakage of liquid fuel from the tank when the vehicle is inclined beyond a certain angle or rolled over. Such valves can be gravity- or liquid-operated, and suitable valves are well-known and widely available. It will be understood that the type of shutoff vent valve used is not important as long as it functions to vent vapor from the fuel tank without releasing liquid fuel.

A rollover vent line 28 delivers the fuel vapor vented from rollover valve 26 to a vapor collection canister 30 via head valve 34 of the present invention. Canister 30 processes and recycles the fuel vapor in known fashion.

A novel head valve 34 according to the present invention is connected between fuel tank 10 and canister 30 to maintain a suitable vapor pressure head in the tank for normal vehicle operating conditions and for operating the filler nozzle shutoff mechanism and preventing tank overfill during refueling. While it is desirable to maintain a relatively high pressure in tank 10 during refueling operations as described above, the tank head pressure during normal vehicle operating conditions is preferably lower to minimize puff loss and compensate for vapor pressure buildup as the fuel warms. Valve 34 accordingly adjusts itself to maintain a high pressure head for refueling and a lower pressure head for normal vehicle operation.

Valve 34 includes a hollow valve body 35 which can be integrally molded or, as shown, molded in separate portions and assembled by mechanical snap-fit, ultrasonic welding, or other known techniques to create a unitary, vaportight whole. The valve body 35 is preferably made from a fuel-resistant polymer such as acetal resin or a nylon-based material, although other materials can be used.

Head valve 34 includes a signal pressure inlet 36 communicating with upper end 11 of the filler pipe via signal line 22. A tank pressure inlet 38 receives fuel tank vapor pressure through rollover vent line 28. A canister outlet 40 communicates with vapor canister 30 via vent line 32.

A head valve element 42 is positioned in valve 34 in series between tank pressure inlet 38 and canister outlet 40 to control vapor venting from tank 10 to canister 30. Head valve element 42 is slidingly held within a circular nest 44 defining a valve seat 45 and circular vent opening 46. Head valve element 42 is essentially cylindrical in shape, with a rounded, closed lower end 43 which seals against valve seat 45. This closes vent opening 46 and shuts off vapor flow between tank 10 and canister 30 through valve 34 except through small bleed orifice 41 in element 42. Head valve element 42 can be formed from a variety of materials, but is preferably formed from a fuel-resistant polymer.

When valve element 42 is raised a sufficient distance off valve seat 45, vapor from opening 46 is vented through radial vent ports 47 in nest 44, outlet 40, and canister line 32 to canister 30.

While head valve element 42 is shown in the illustrated embodiment as a somewhat thimble-shaped device, it will be apparent that other configurations can be used. For example, ball- or plate-shaped head valve elements would also work in the present invention. For example, the dimensions and relative positions of nest 44, valve element 42, opening 46, and radial vents 47 can be determined according to the invention in co-owned U.S. Pat. No. 5,253,668 for a low-hysteresis ball head valve.

Head valve element 42 is positively biased to its closed position against valve seat 45 by a bias spring 48 abutting an inside wall of valve body 35 and trapped within the hollow interior of head valve element 42 to force it downwardly against valve seat 45.

Figure 3:
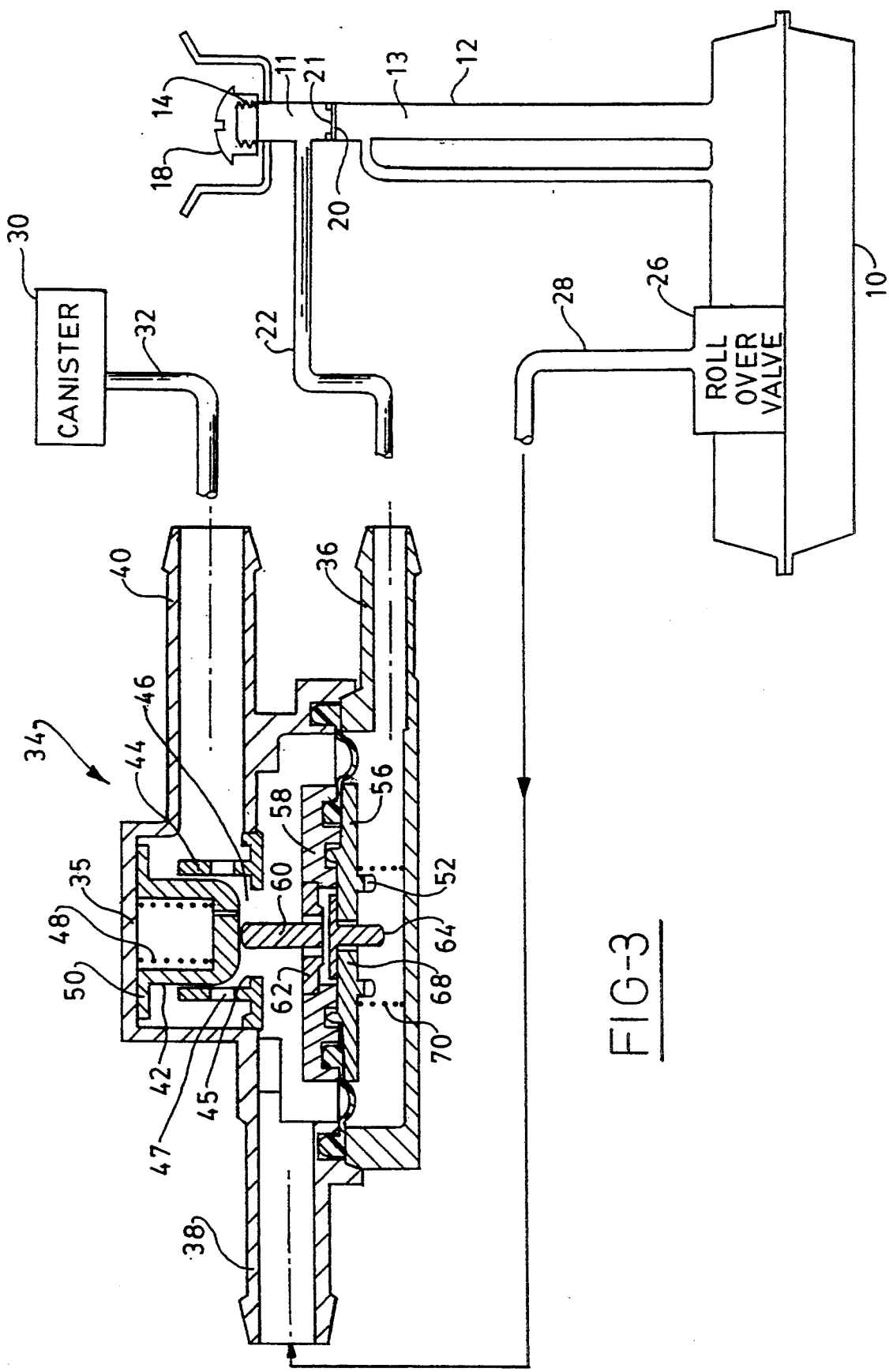
FIG. 3 illustrates the valve of FIG. 1 when the head valve relief bias has been exceeded.

Head valve element 42 includes a radial shoulder 50 which limits the upward travel of head valve element 42 by abutting the wall of valve body 35. The height of nest 44, the axial length of head valve element 42 between rounded lower end 43 and shoulder 50, and the large, flat, even surface of shoulder 50 ensure that head valve element 42 remains centered relative to nest 44 and valve seat 45 as it moves between the closed nonventing position of FIG. 1 and the open venting position of FIG. 3. These dimensions also ensure that radial vents 47 are uncovered for venting when valve element 42 is fully opened as shown in FIG. 3, but remain closed to maintain suitable tank pressure when the closing force or relief bias of valve element 42 is merely reduced.

Valve 34 includes a diaphragm control valve 52 connected in series between tank pressure inlet 38 and signal pressure inlet 36, and coaxially aligned with head valve element 42. Diaphragm control valve 52 includes a circular, flexible diaphragm 54 carrying a rigid control plate 56 and carrier plate 58. Flexible diaphragm 54 is held between control plate 56 and carrier plate 58 and fixed to valve body 35 by circumferential beads 55 clamped securely between control plate 56 and carrier plate 58, and upper and lower portions of valve body 34.

Carrier plate 58 includes an integrally molded actuating finger 60 of a length which does not engage head valve element 42 when diaphragm control valve 52 is in the lowered position shown in FIG. 1.

Carrier plate 58 and control plate 56 include drain passages 62,64 to permit drainage of liquid fuel from upper end 11 of the filler pipe through signal pressure line 22, inlet 36, control valve 52 and out rollover inlet 38 to tank 10. Upper end 11 is higher than valve 34, and gravity forces the liquid through diaphragm control 52.

Passages 62,64 communicate via an internal chamber 66 enclosing a small, heavier-than-fuel T-shaped check valve 68 which is axially movable between seats 160,161 on control plate 56 and carrier plate 58. The check valve is designed to stop gross liquid flow from the upper end 11 of the filler pipe during a vehicle rollover condition by sealing passages 62 at seat 160. During normal (upright) vehicle operation the mass of check valve 68 jiggles on seat 161 around passage 64 to drain liquid from line 22 to inlet 38. Check valve 68 also prevents fuel vapor flow from tank 10 through signal pressure line 22 and out inlet 14 to the atmosphere during refueling.

Diaphragm control valve 52 is given an upward bias by bias spring 70 which, when vapor pressure is equal on both sides of control valve 52, forces it upwardly into contact with head valve element 42 to reduce the closing force of spring 48.

OPERATION OF THE ILLUSTRATED EMBODIMENT

During the refueling operation as shown in FIG. 1, cap 18 is removed from inlet 14 of filler pipe 12, resulting in a shift from tank pressure to atmospheric pressure. This pressure change is communicated via signal pressure line 22 through signal pressure inlet 36 to the lower surface of diaphragm control valve 52. At the same time the upper surface of diaphragm control valve 52 is subject to higher tank vapor pressure via rollover valve 26, rollover vent line 28 and tank pressure inlet 38. The surface area of diaphragm control valve 52 is such that this pressure imbalance between its upper and lower surfaces forces it downwardly against the bias of spring 70 as shown.

In this lowered position actuating finger 60 is pulled out of abutting engagement with head valve element 42, leaving the full force of bias spring 48 to hold head valve element 42 in the closed position against valve seat 45. The closing force of bias spring 48 is relatively high and holds head valve element 42 on valve seat 45 until a specified pressure head in fuel tank 10 is exceeded. In this illustrated embodiment the tank pressure head maintained by head valve element 42 in the cap-off refueling condition is approximately 12 inches of water pressure, enough to efficiently operate the automatic shut off mechanism in standard filler nozzles while preventing overfill.

Once cap 18 has been removed, and head valve 34 responsively adjusts itself to maintain a pressure head sufficient for refueling, filler nozzle 15 is inserted through partition 20 to introduce fuel into lower end 13 of filler pipe 12 and fuel tank 10. The high pressure head maintained in fuel tank 10 by valve 34 ensures a rise in liquid fuel and vapor pressure in lower end 13 and vent line 24 as the tank fills to activate the nozzle shutoff in known manner.

Although signal line 22 and vent line 24 are described and shown in the illustrated embodiment for a nonvaportight partition 20 and door 21, it will be apparent to those skilled in the art that they can be repositioned to ensure proper refueling and operation of valve 34 for vaportight partitions and/or seal doors 20,21. For example, if a vaportight partition 20 is used in filler pipe 12, the partition effectively becomes the filler pipe "inlet" and signal line 22 can be connected below the partition to communicate the filler pipe pressure changes to valve 34.

During the refueling operation the vapor pressure maintained in fuel tank 10 is continuously present on the upper surface of diaphragm control valve 52. Check valve 68 closing passage 64 in control plate 56 prevents the flow of fuel vapor to the lower surface of control valve 52, which is maintained at lower atmospheric pressure via signal pressure inlet 36, signal pressure line 22 and upper end 11 of filler pipe 12. The greater vapor pressure on the upper surface of diaphragm control element 52 forces it downwardly against spring 70 as shown in FIG. 1, away from head valve element 42.

If at any point during refueling the desired pressure head, e.g., 12 inches, in tank 10 is exceeded, head valve element 42 is forced upwardly off valve seat 45, against the bias of spring 48 to vent excess vapor pressure to vapor canister 30 via vent opening 46, canister outlet 40 and canister vent line 32.

Figure 2:
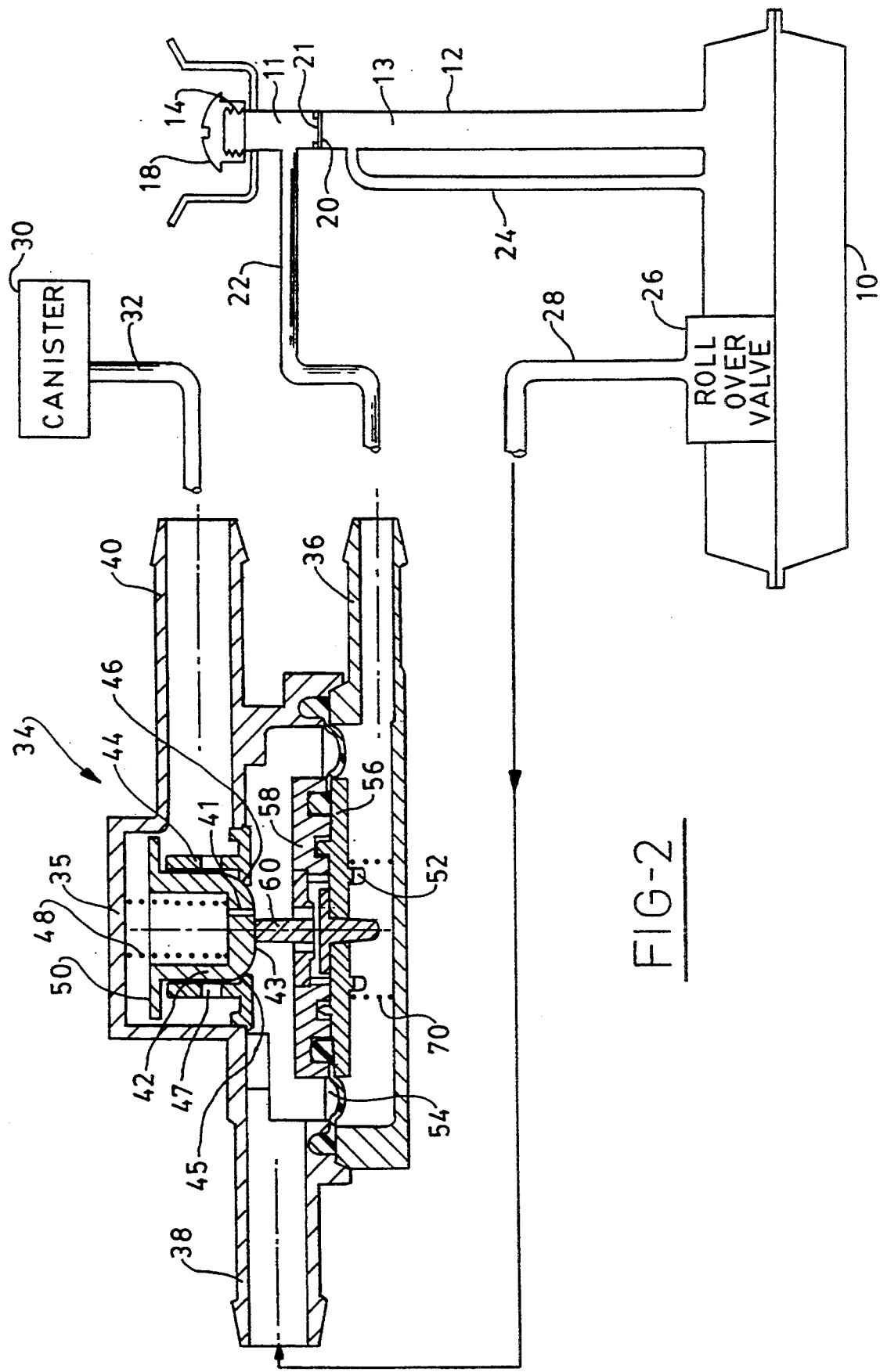
FIG. 2 illustrates the valve of FIG. 1 under normal vehicle operating conditions.

Referring now to FIG. 2, when the refueling operation is completed, the filler nozzle is withdrawn from partition 20 and cap 18 is replaced to close inlet 14 and filler pipe 12. Via the non-sealing trap door 21, upper end 11 of filler pipe 12 returns to tank vapor pressure. This increase in pressure is transmitted to the lower surface of diaphragm control valve 52 via signal pressure line 22 and signal pressure inlet 36, eliminating the pressure imbalance across diaphragm control valve 52 and allowing bias spring 70 to force actuating finger 60 upwardly against head valve element 42 and the relief bias of spring 48. The relief bias of head valve element spring 48 is accordingly reduced such that head valve element 42 can no longer maintain the high refueling pressure head in tank 10. Instead, head valve element 42 is effectively adjusted to maintain a lower pressure head in tank 10, in the illustrated embodiment on the order of one to two inches of water pressure during normal vehicle operation. When the vehicle is operating, head valve element 42 will accordingly be "blown" or forced open to vent fuel vapor from tank 10 to canister 30 often enough to keep the pressure head in tank 10 relatively low.

Because in the cap-on condition the pressure across control valve 52 is balanced, the amount of bias-reducing force exerted by finger 60 against head valve element 42 can be carefully controlled by selecting a spring 70 of the desired opposing force.

When the cap is on and head valve element 42 is in the closed position, spring 70 alone exerts a bias-reducing force against element 42. When head valve element 42 opens to vent excess pressure, however, the flow temporarily reduces the vapor pressure on the vapor surface of diaphragm control valve 52, creating a brief pressure imbalance acting upwardly to assist spring 70. This condition exists as long as vapor is flowing, and is somewhat proportional to flow rate.

When the vehicle fuel system is in the cap-on vehicle operating condition of FIG. 2, the pressure balance across check valve 68, its radial dimensions and its result in its being held loosely within chamber 66, allowing it to "jiggle" and pass liquid fuel from passage 64 through passages 62.

Should vacuum conditions develop in fuel tank 10, make-up of vacuum relief pressure from canister 30 is pulled through a small bleed orifice 41 in the lower end 43 of head valve element 42 and through inlet 38 to tank 10. The flow rate of bleed orifice 41 is small enough that it does not affect the tank pressure head sufficiently to cause overfill problems during refueling.

Accordingly, the valve 34 of the present invention is automatically responsive to changing pressure conditions to adjust the tank pressure head as needed for refueling and for normal vehicle operation. The system described in the illustrated embodiment is essentially cap-responsive in that changes in pressure conditions near the filler pipe inlet 14 corresponding to refueling and normal vehicle operation are caused by replacement or removal of cap 18. However, it will be understood by those skilled in the art that the head valve of the present invention can be readily adapted to any vehicle fuel system in which the change from normal vehicle operation to refueling operation is indicated by a pressure change in some portion of the filler pipe. The adjustment of the tank pressure head maintained by valve 34 automatically occurs in response to those changing pressure conditions.

Although a preferred embodiment of the invention has been shown and described, it will be apparent to those skilled in the art that other adaptations and modifications can be made without departing from the spirit and scope of the invention. Accordingly, the invention is not to be limited, except as by the following claims.

I claim:

1. In a vehicle fuel system having a fuel tank, a filler pipe with an inlet selectively opened and closed for introducing fuel into the tank, and a vapor collection canister receiving fuel vapor from the tank, a pressure head valve responsive to pressure conditions in the region of the filler pipe inlet comprising:
   a valve body connected in vapor communication between the fuel tank and the vapor canister;
   signal pressure means communicating pressure changes from the region of the filler pipe inlet to the valve body;
   head valve means in the valve body in series between the fuel tank and the vapor canister, the head valve having a spring bias to a closed position to prevent vapor flow between the tank and canister below a predetermined pressure head in the fuel tank; and
   control means in the valve body communicating with the signal pressure means, the control means being responsive to pressure changes in the filler pipe such that when the inlet is closed the head valve spring bias is reduced from a first higher pressure head maintaining level to a second lower pressure head maintaining level while remaining in the closed position.

2. Apparatus as defined in claim 1, wherein the head valve means are in series between the fuel tank and the canister, and the control means are in series between the fuel tank and the signal pressure means.

3. In a vehicle fuel system having a fuel tank, a filler pipe with an inlet selectively opened and closed for introducing fuel into the tank, and a vapor collection canister receiving fuel vapor from the tank, a pressure head valve responsive to pressure conditions in the region of the filler pipe inlet comprising:
   a valve body connected in vapor communication between the fuel tank and the vapor canister;
   signal pressure means communicating pressure changes from the region of the filler pipe inlet to the valve body;
   head valve means in the valve body in series between the fuel tank and the vapor canister, the head valve having a bias to a closed position to prevent vapor flow between the tank and canister below a predetermined pressure head in the fuel tank; and
   control means in the valve body communicating with the signal pressure means, the control means being responsive to pressure changes in the filler pipe such that when the inlet is closed the head valve bias is reduced from a first higher pressure head to a second lower pressure head at which it will open to vent the tank to the canister, wherein the head valve means are in series between the fuel tank and the canister, the control means are in series between the fuel tank and the signal pressure means, and the control means include mechanical actuating means for making bias-reducing contact with the head valve means when the filler pipe inlet is closed after a refueling operation.

4. Apparatus as defined in claim 3, wherein the head valve means is biased to the closed position by spring means.

5. Apparatus as defined in claim 3, wherein the control means is a pressure-responsive diaphragm control element biased toward the head valve means when the filler pipe inlet is closed, and away from the head valve means when the filler pipe inlet is open.

6. Apparatus as defined in claim 5, wherein the diaphragm control element includes drainage means.

7. Apparatus as defined in claim 6, wherein the drainage means include check valve means.

8. In a vehicle fuel system having a fuel tank, a filler pipe with an inlet selectively opened and closed for introducing fuel into the tank, and a vapor collection canister receiving fuel vapor from the tank, a valve responsive to pressure conditions in the region of the filler pipe inlet comprising:
   a valve body connected in vapor communication between the fuel tank and the vapor canister;
   signal pressure means communicating pressure changes from the region of the filler pipe to the valve body;
   pressure-responsive control means in the valve body in series between the fuel tank and the signal pressure means, the control means movable between a first position when the filler pipe inlet is open, and a second position when the filler pipe inlet is closed;
   head valve means in the valve body in series between the fuel tank and the vapor canister, the head valve having a spring bias to a closed position to prevent vapor flow between the tank and canister below a predetermined pressure head, the control means being operative to reduce the head valve spring bias from a first higher pressure head maintaining level when the control means are in the first position to a second lower pressure head maintaining level when the control means are in the second position while leaving the head valve in the closed position.

9. In a vehicle fuel system having a fuel tank, a filler pipe with an inlet selectively opened and closed for introducing fuel into the tank, and a vapor collection canister receiving fuel vapor from the tank, a valve responsive to pressure conditions in the region of the filler pipe inlet comprising:

a valve body connected in vapor communication between the fuel tank and the vapor canister;

signal pressure means communicating pressure changes from the region of the filler pipe to the valve body;

pressure-responsive control means in the valve body in series between the fuel tank and the signal pressure means, the control means movable between a first position when the filler pipe inlet is open, and a second position when the filler pipe inlet is closed;

head valve means in the valve body in series between the fuel tank and the vapor canister, the head valve having a bias to a closed position to prevent vapor flow between the tank and canister below a predetermined pressure head, the control means operative to adjust the head valve bias from a first higher pressure head when the control means are in the first position to a second lower pressure head when the control means are in the second position, wherein the head valve means is biased to the closed position by a spring, wherein the control means comprise a diaphragm control element biased to a first position away from the head valve means when the filler pipe inlet is open, and biased toward the head valve means in a second position when the filler pipe inlet is closed, the diaphragm control element including a mechanical actuating element which contacts the head valve means in the second position to reduce the spring bias holding the head valve means in the closed position.

10. In a vehicle fuel system having a fuel tank, a filler pipe with an inlet selectively opened and closed for introducing fuel into the tank, and a vapor collection canister receiving fuel vapor from the tank, a pressure head valve responsive to pressure conditions in the region of the filler pipe inlet to adjust the pressure head it maintains in the fuel tank comprising:

a valve body having a first inlet connected to the fuel tank, a second outlet connected to the vapor canister, and a third inlet connected to the region of the filler pipe inlet;

a spring-biased head valve positioned in the valve body in series between the fuel tank vapor inlet and the canister vapor outlet;

a diaphragm control element in the valve body positioned in series between the fuel tank vapor inlet and the filler pipe vapor inlet, the diaphragm control element in parallel with the head valve, the diaphragm control element pressure balanced to a first position away from the head valve when the filler pipe inlet is open for refueling, and spring-biased to a second position toward the head valve when the filler pipe inlet is closed; and a mechanical actuating element associated with the diaphragm control element such that it is forced into contact with the head valve by the spring bias of the diaphragm control element in the second position to reduce the spring bias of the head valve and the fuel tank pressure head maintained by the head valve.

11. Apparatus as defined in claim 10, wherein the head valve, diaphragm control element and mechanical actuating element are coaxial.

12. Apparatus as defined in claim 10, wherein the spring bias of the head valve to the closed position is greater than the spring bias of the diaphragm control element to the second position.

13. Apparatus as defined in claim 11, wherein the diaphragm control element includes drainage means.

14. Apparatus as defined in claim 13, wherein the drainage means include internal check valve means.

15. Apparatus as defined in claim 10, wherein the head valve includes vacuum relief means to vent pressure from the vapor canister to the fuel tank when the fuel tank is at a lower vapor pressure.

16. Apparatus as defined in claim 9, wherein the diaphragm control element is pressure-balanced to the first position, and spring-biased to the second position.

* * * * *

UNITED STATES PATENT AND TRADEMARK OFFICE
CERTIFICATE OF CORRECTION

PATENT NO. : 5,417,240
DATED : May 23, 1995
INVENTOR(S) : Benjey

It is certified that error appears in the above-indentified patent and that said Letters Patent is hereby corrected as shown below:

On the title page item [56],

Under References Cited, delete "Kabayashi" and insert --Kobayashi--;

Under References Cited, delete "Selaga" and insert --Szlaga--.

Signed and Sealed this

Eighth Day of August, 1995

*Attest:*

BRUCE LEHMAN

*Attesting Officer*      *Commissioner of Patents and Trademarks*